US012742532B2

(12) United States Patent
Adamlje et al.

(10) Patent No.: US 12,742,532 B2
(45) Date of Patent: Sep. 22, 2026

(54) ILLUMINATED TRIM PART OF OR FOR A VEHICLE AND METHOD FOR PRODUCING SUCH AN ILLUMINATED TRIM PART

(71) Applicant: HELLA SATURNUS SLOVENIJA d.o.o., Ljubljana (SI)

(72) Inventors: Ales Adamlje, Ivancna Gorica (SI); Matic Suhodolcan, Trebnje (SI); Andraz Tekavcic, Kokrica (SI); Fernando Antonio Viu Guerrero, Skofljica (SI)

(73) Assignee: HELLA SATURNUS SLOVENIJA d.o.o., Ljubljana (SI)

(*) Notice: Subject to any disclaimer, the term of this patent is extended or adjusted under 35 U.S.C. 154(b) by 0 days.

(21) Appl. No.: 19/211,557

(22) Filed: May 19, 2025

(65) Prior Publication Data

US 2025/0361999 A1 Nov. 27, 2025

(30) Foreign Application Priority Data

May 21, 2024 (EP) .................................... 24177006

(51) Int. Cl.

| | |
|---|---|
| ***F21S 41/50*** | (2018.01) |
| ***F21S 41/20*** | (2018.01) |
| *F21W 104/00* | (2018.01) |

(52) U.S. Cl.

CPC ............ *F21S 41/50* (2018.01); *F21S 41/285* (2018.01); *F21W 2104/00* (2018.01)

(58) Field of Classification Search

CPC .... F21S 41/50; F21S 41/285; F21W 2104/00; B60R 13/04

See application file for complete search history.

(56) References Cited

U.S. PATENT DOCUMENTS

| | | | | |
|---|---|---|---|---|
| 2019/0100159 | A1* | 4/2019 | Schöne | F21S 43/245 |
| 2023/0032918 | A1* | 2/2023 | Mayer Pujadas | H01Q 1/42 |
| 2024/0010137 | A1* | 1/2024 | Schneebauer | G02B 6/0065 |
| 2024/0162603 | A1* | 5/2024 | Izquierdo Fernandez | G01S 7/027 |

FOREIGN PATENT DOCUMENTS

| | | | |
|---|---|---|---|
| CN | 112201174 | A | 1/2021 |
| DE | 102006055971 | A1 | 6/2008 |
| DE | 102020129958 | A1 | 7/2021 |
| DE | 102020133087 | A1 | 4/2022 |
| EP | 3651266 | A1 | 5/2020 |
| EP | 3848628 | A1 | 7/2021 |
| FR | 3034495 | A1 | 10/2016 |

* cited by examiner

*Primary Examiner* — Robert J May

(74) *Attorney, Agent, or Firm* — WARNER NORCROSS + JUDD LLP

(57) ABSTRACT

The present invention relates to an illuminated or illuminable trim part of or for a vehicle. The trim part includes a light source for providing light, a transparent or translucent carrier layer, and a foil. At least one opaque component is applied to the carrier layer or is integrated into the carrier layer, and/or at least one painted layer is applied to the carrier layer. The foil comprises printed areas and/or has at least one cut-out through which light provided by the light source can penetrate. Moreover, the present invention relates to a method for manufacturing such a trim part.

12 Claims, 3 Drawing Sheets

A-A

ILLUMINATED TRIM PART OF OR FOR A VEHICLE AND METHOD FOR PRODUCING SUCH AN ILLUMINATED TRIM PART

CROSS-REFERENCE TO RELATED APPLICATIONS

The present application claims the benefit of European Patent Application No. 10-24177006.4, filed May 21, 2024, the disclosure of which is incorporated by reference.

FIELD OF THE INVENTION

The present invention relates to an illuminated trim part of or for a vehicle and to a method for producing such an illuminated trim part.

BACKGROUND OF THE INVENTION

An increasing number of trim parts of vehicles are becoming illuminated, mainly because of aesthetic reasons but also to provide the trim parts with a specific functionality by showing a certain information. This can be done in that an area of the illuminated trim part is switched from turned-off to illuminated or vice versa, is blinking or is illuminated in a certain color. This applies mainly to interior trim parts. However, also exterior trim parts become more and more illuminated. The front grille of a vehicle is an example of an exterior trim part to be emphasized as it contains a key role in differentiating one vehicle of a particular brand from another one. Illuminated front grilles typically comprise complex patterns or graphics, amongst others the logo of the vehicle manufacturer. The illuminated parts of the front grilles are becoming bigger, and the complexity of the graphics is increasing.

Complex graphics may be provided by multiple layer painting combined with laser removal of paint. To this end, many manufacturing steps are necessary. At the same time the amount of scrap is high such that this manufacturing method is rather expensive.

Another way for providing complex graphics may be the use of decorated foils which may be screen printed. Using such a method, complex shapes and colors extending over the complete trim part may be provided, however, also this way is usually expensive.

SUMMARY OF THE INVENTION

It is one task of one embodiment of the present invention to present an illuminated trim part which comprises complex graphics but can at the same time be provided in a cost-effective way. Furthermore, an embodiment of the present invention has the object to provide a method for producing such an illuminated trim part.

One embodiment of the present disclosure is directed to an illuminated trim part of or for a vehicle, comprising:

- a light source for providing light,
- a transparent carrier layer,
  - at least one opaque component applied to the carrier layer or integrated into the carrier layer, and/or
  - at least one painted layer applied to the carrier layer, and
- a foil
  - comprising printed areas, and/or
  - having at least one cut-out through which the light provided by the light source can penetrate.

One core idea of the present invention is to divide the graphics of a given trim part to be illuminated in areas in which the graphics are fairly simple and in areas in which the graphics are more complex. As mentioned, the grille of a vehicle is a trim part of particular importance. Usually, the logo of the vehicle manufacturer is centrally arranged whereas other parts like the frame of the grille are peripherally arranged. While the frame typically has a fairly simple shape, the logo of the vehicle manufacturer tends to be of a higher complexity. Depending on the relevant legislation effective in a given country, the logo of the vehicle manufacturer must not be illuminated. In this case the foil may be opaque and comprise printed areas representing the logo. In case the relevant legislation allows the illumination of the logo, the opaque foil may comprise cut-outs representing the logo such that the light provided by the light source can penetrate the foil and be conceived from the surroundings of the vehicle in an illuminated manner.

The illumination of the frame may be achieved by opaque components that are arranged such that the course of the frame is illuminated while the surroundings remain dark.

The use of the relatively expensive foil is restricted to the area where it is necessary while the other areas of the grille are illuminated in the desired way by the cheaper opaque components. The overall manufacturing costs of such a grille can be kept low.

In another embodiment:

- the opaque component and/or the painted layer being applied such that at least one blank area on the carrier layer is formed that is covered neither by the opaque component nor the painted layer, and
- the foil is transparent or translucent to light provided by the light source and arranged in the blank area.

The term translucent may be understood in a way that in particular the color and/or the intensity of the light penetrating therethrough are changed. The foil may comprise transparent and translucent areas arranged adjacent or at distance to each other. Thus particular illumination effects in particular using changing colors and/or changing intensities may be provided.

The arrangement in the blank area enables the direct application of the foil with light provided by the light source such that the intensity of the light is not or almost not reduced between the light source and the foil.

In another embodiment the printed areas are translucent or opaque to the light. The foil as such may be transparent. This embodiment is particularly suited to provide illuminated graphics, in particular the logo of the vehicle manufacturer. The printed area is extending over a significant part of the foil, only leaving out sections in the shape of the desired logo. The light can penetrate these sections or penetrates these sections in a different intensity and/or different color compared to the remaining areas. As a result, the logo is well visible even at night.

In a further embodiment characterized in that the carrier layer has an outer surface and an inner surface, the inner surface facing the light source, wherein the opaque component, and/or the painted layer, and/or the foil is/are arranged in the inner surface.

The inner surface is shielded from outer influences such as UV-radiation, temperature and stone chipping. The arrangement on the inner surface preserves the illumination of the grille for a significantly longer time. However, it should be noted that in particular the foil may also be arranged on the outer surface of the carrier layer.

In another embodiment the printed areas comprise ink and/or paint. The use of ink and paint turned out to be well suited for providing complex patterns to be illuminated. The ink may be transparent or translucent or opaque.

In another embodiment the trim part further comprises a transparent or translucent protective layer applied to the outer surface of the carrier layer. The protective layer shields the trim part from external influences such as UV-radiation and stone chipping.

According to another embodiment a transparent or translucent anti-fog layer is applied on the inner surface and/or on the foil. Depending on the design of the trim part, it may form a closed housing which is not or only poorly ventilated. This may increase the risk that condensed water accumulates on the areas penetrable for the light provided by the light source. Accumulated water deteriorates the quality of the illuminated patterns in particular regarding sharpness and homogeneity. The application of an anti-fog layer reduces the accumulation of condensed water and concomitantly the aforementioned adverse effects.

A further embodiment the painted layer comprises void areas through which the light can penetrate. The void areas may be provided by laser ablation by which structures of high filigree can be provided.

According to another embodiment a further painted layer is arranged on the painted layer. Areas of different colors and intensities can be provided.

Another aspect of the invention is directed towards a method for producing an illuminated trim part according to one of the preceding embodiments, including the following steps: printing the printed areas on the foil; inserting the foil into an injection mold; and molding the transparent carrier layer and thereby overmolding the foil.

The technical effects and advantages as discussed with regard to the present trim part equally apply to the method. Briefly, the use of a foil is restricted to areas where the complexity of the graphics to be illuminated is fairly high while other areas in which the graphics have a lesser complexity are provided by a painted layer and/or opaque components. The overall costs of the respective trim part can be kept low, in particular, as only very few injection molding steps are necessary.

In a further embodiment the method comprises the following step: forming the foil by high pressure forming between the steps of printing and inserting. This embodiment is particularly suited when the trim part has a pronounced curvature or kinks.

In another embodiment the method comprises the following step: producing the carrier layer and the opaque component by two component injection molding. It is not necessary to employ an additional step for providing the opaque component. Thus, the production costs and the production time can be kept low.

The present invention is also directed to a vehicle comprising a trim part according to one of the preceding embodiments and/or a trim part which is manufactured by a method according to one of the preceding embodiments. The technical effects and advantages as discussed with regard to the present trim part equally apply to the vehicle.

BRIEF DESCRIPTION OF THE DRAWINGS

The present invention is described in detail with reference to the drawings attached wherein.

DETAILED DESCRIPTION OF THE CURRENT EMBODIMENT

Figure 1A:
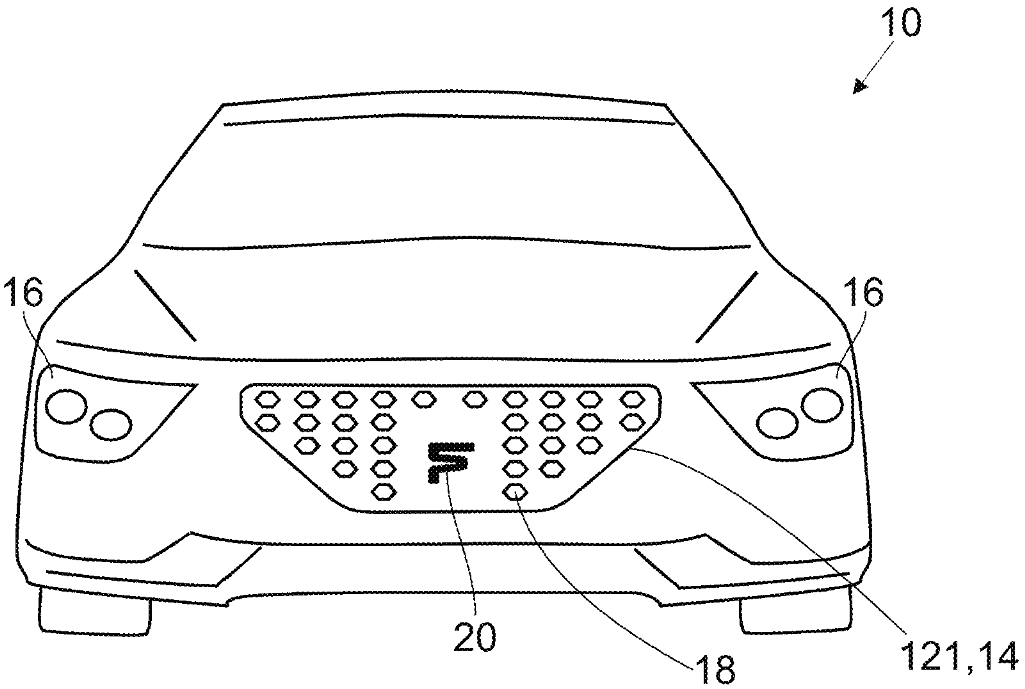
FIG. 1A shows the front of a vehicle that comprises an illuminable trim part, in this case a grille, according to the invention, the trim part not being illuminated.
Figure 1B:
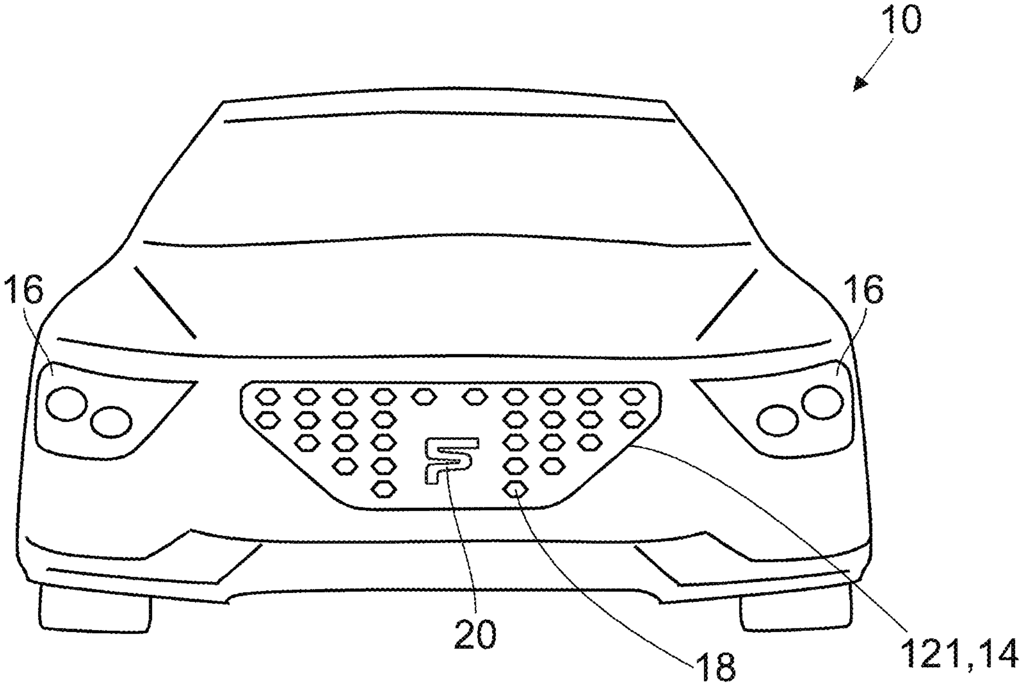
FIG. 1B shows the vehicle shown in FIG. 1A, however, the trim part being illuminated.

FIGS. 1A and 1B show a front view of a vehicle 10 that comprises a first embodiment of an illuminated or illuminable trim part 121 according to the present invention. The trim part 121 is embodied as a front grille 14 that extents between a left headlamp 16 and a right headlamp 16 of the vehicle 10.

The grille 14 has different patterns 18 that may be illuminated, namely a number of hexagons, and a logo 20 that may be the logo 20 of the vehicle manufacturer. In FIG. 1A the grille 14 is not illuminated while it is illuminated in FIG. 1B. The different illumination statuses are illustrated by the logo 20 only. In the non-illuminated state shown in FIG. 1A the logo 20 is black while in the illuminated state as shown in FIG. 1B the logo 20 is white with only its contour remaining black.

Figure 2A:
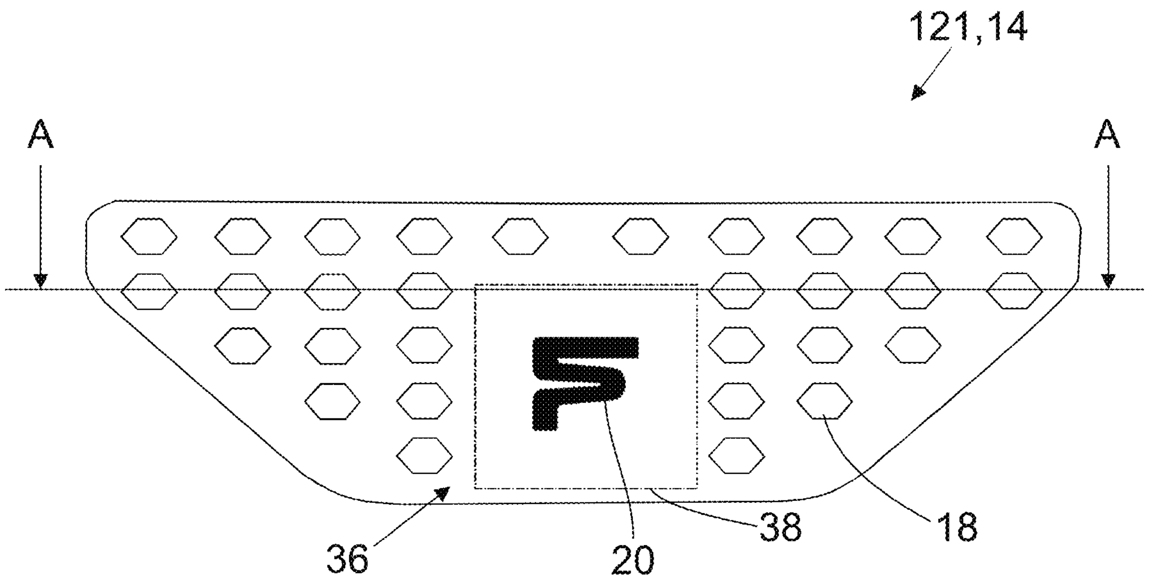
FIG. 2A shows an isolated front view of a first embodiment of the grille shown in FIG. 1A.
Figure 2B:
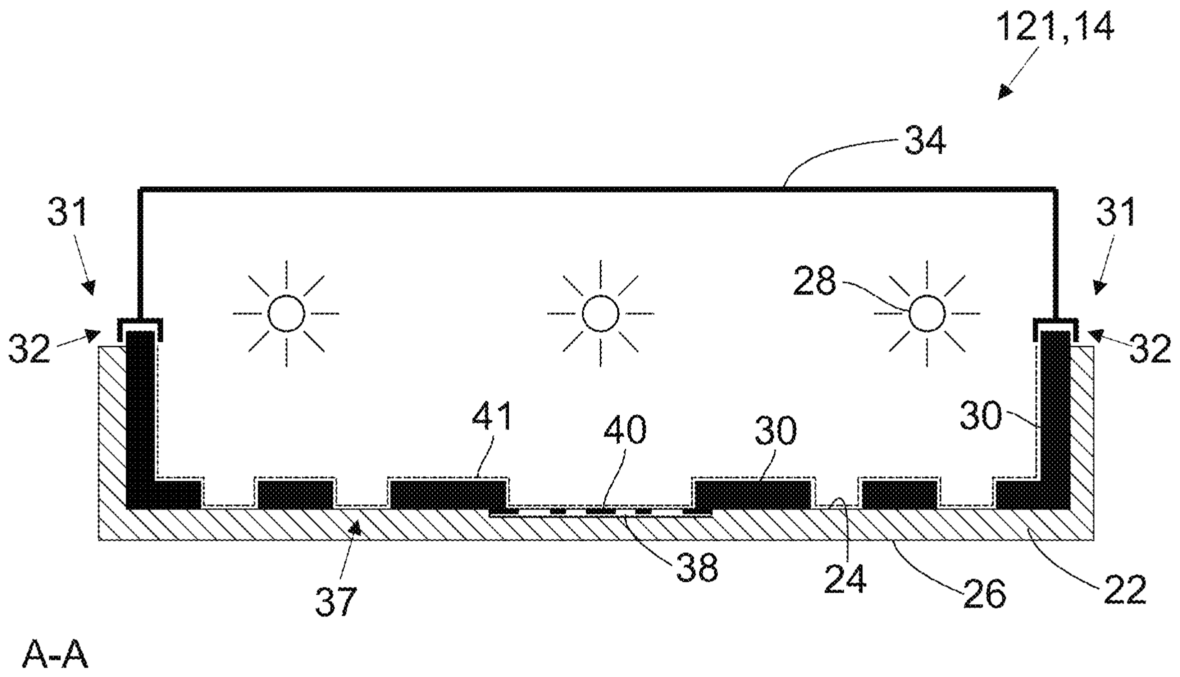
FIG. 2B shows a sectional view of the grille along the cutting plane A-A defined in FIG. 2A.

In FIGS. 2A and 2B the trim part 121 of the vehicle 10 of FIGS. 1A and 1B is separately shown by different views. FIG. 2B is a sectional view along the cutting plane A-A defined in FIG. 2A. However, it is noted that the Figures are only of principle nature. Therefore, FIG. 2B only approximately represents the illuminated trim part 121 of FIG. 2A.

The trim part 121 comprises a transparent carrier layer 22, sometimes also referred to as lens, which approximately has a U-shape and forms an inner surface 24 and an outer surface 26. Moreover, the trim part 121 is provided with a number of light sources 28. The inner surface 24 of the carrier layer 22 is facing the light sources 28 while the outer surface 26 is directed to the surroundings of the vehicle 10.

A number of opaque components 30 are arranged on the inner surface 24. They may be provided in the same injection molding step as the carrier layer 22 using two component injection molding. However, they may also be connected to the carrier layer 22 in a different manufacturing step, e.g., by glueing.

On the lateral areas 31 of the trim part 121 the opaque components 30 form a fastening section 32 by which the trim part 121 can be connected to a housing 34 or support elements of the vehicle 10. Moreover, the opaque components 30 prevent light from entering and exiting the trim part 121 at the lateral areas 31.

Towards the center of the trim part 121, the opaque components 30 form hexagonal openings 37 through which the light provided by the light source 28 can pass and enter the surroundings of the vehicle 10, thereby providing the grille 14 with the respective illuminated pattern 18. Moreover, the opaque components 30 to not extend to a central blank area 36 of the carrier layer 22 (see FIG. 2A).

A foil 38 is located in the blank area 36 and may be overmolded by the carrier layer 22. The foil 38 as such is transparent and comprises printed areas 40 in which an ink or paint is applied to the foil 38. The printed areas 40 are either opaque or translucent. In the first case the light cannot pass through the foil 38 while in the second case the color and/or the intensity of the light is changed compared to the remaining foil 38. In both cases graphics can be projected to the surrounding having a significantly higher complexity compared to the shapes provided by the opaque components 30. As mentioned, graphics of high complexity may be the logo 20 of the vehicle manufacturer as shown in FIGS. 1A and 1B.

According to the present invention the use of the foil 38 is restricted to graphics of high complexity. As the use of foils 38 typically incurs higher manufacturing costs compared to the opaque components 30, the grille 14 can be provided with the desired illumination at lower costs compared to an embodiment in which all the graphics to be illuminated are provided by the foil 38.

A transparent anti-fog layer 41 is applied to the opaque components 30, to the foil 38 and the inner surface 24 of the carrier layer 22 to avoid the accumulation of condensed water that may have a detrimental effect on the light propagation through the trim part 121 and to the surroundings of the vehicle 10.

Figure 3A:
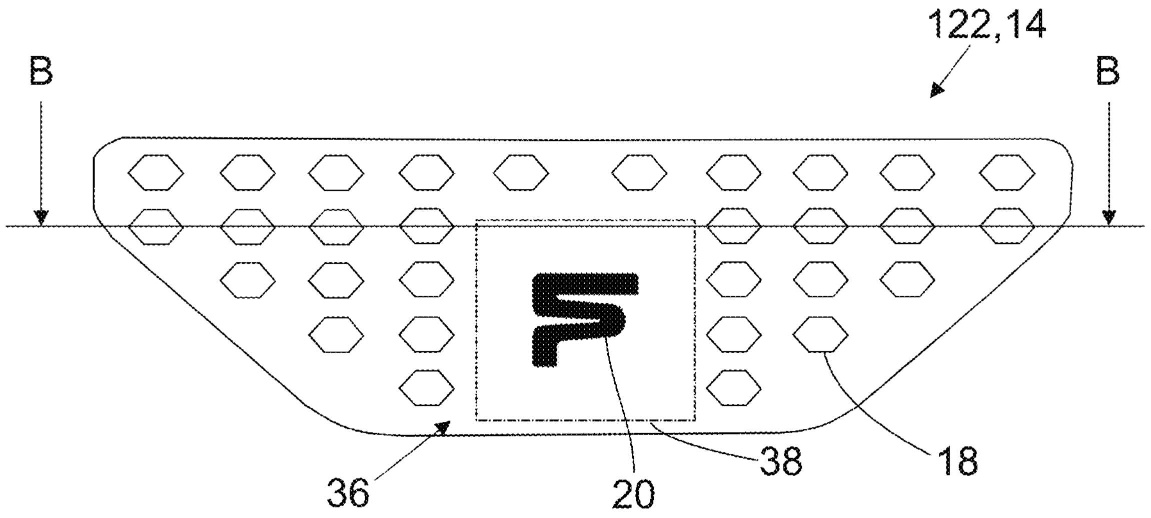
FIG. 3A shows an isolated front view of a second embodiment of the grille shown in FIG. 1A.
Figure 3B:
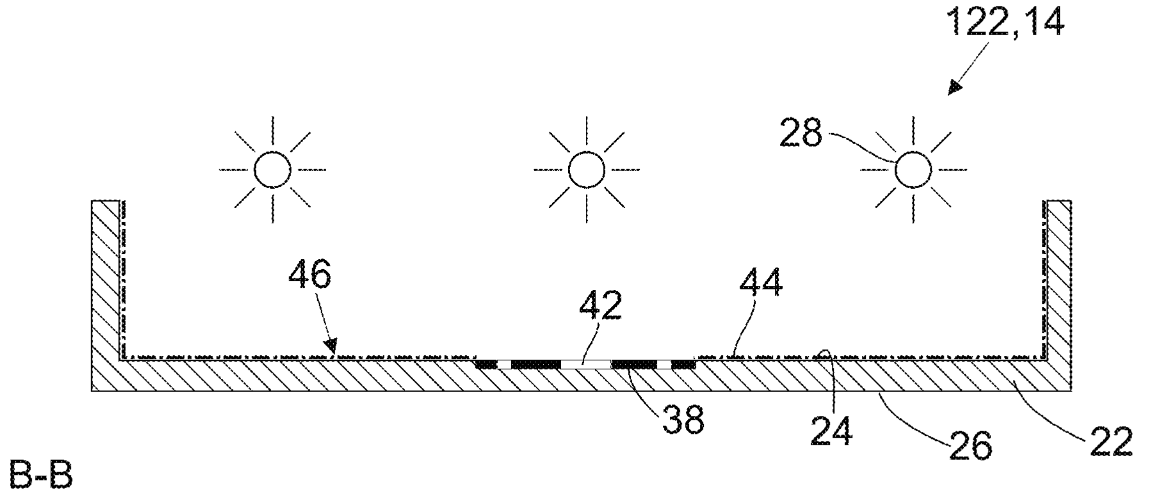
FIG. 3B shows a sectional view of the grille along the cutting plane B-B defined in FIG. 3A.

FIGS. 3A and 3B show a second embodiment of the trim part 122 in which FIG. 3B is a sectional view along the cutting plane B-B defined in FIG. 3A. FIG. 3A only approximately represents the illuminated trim part 122 of FIG. 3A. The construction of the trim part 122 according to the second embodiment is to a large extend similar to the one of the first embodiment of the trim part 122. Therefore, only the main differences are described in the following.

The foil 38 as such is opaque or translucent and comprises cut-outs 42 through which the light provided by the light source 28 may be penetrate. The cut-outs 42 may be produced by laser ablation.

Moreover, a painted layer 44 instead of the opaque components 30 is applied to the inner surface 24 of the carrier layer 22. The painted layer 44 forms void areas 46 through which the light can penetrate. The void areas 46 may be provided by laser ablation.

In FIG. 3B the housing 34 is not shown. However, the carrier layer 22 can be provided with fastening sections 32 as shown in FIG. 2B to connect the trim part 122 with a housing 34 or with support element of the vehicle 10 (not shown).

Figure 4:
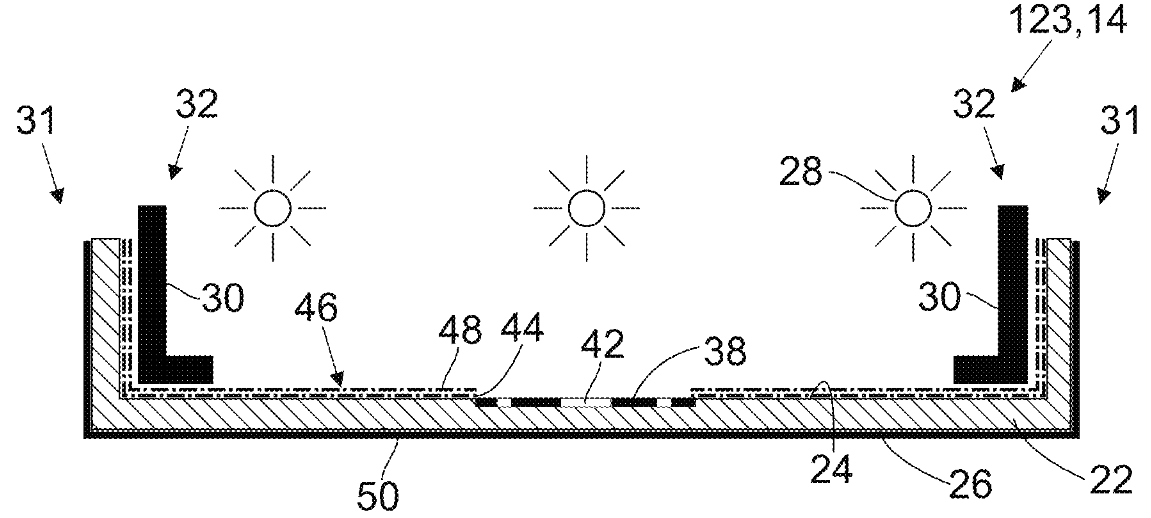
FIG. 4 a view along the lines with FIGS. 2B and 3B of a third embodiment of the grille.

FIG. 4 shows a third embodiment of the trim component 123 that is to a large extend similar to the second embodiment of the trim part 123 shown in FIGS. 3A and 3B. The main difference is that a further painted layer 48 is applied to the painted layer 44. In the third embodiment, the further painted layer 48 completely covers the painted layer 44. However, the further painted layer 48 may only partially cover the painted layer 44. The color and the intensity of the light penetrating the painted layer 44 and the further painted layer 48 can be changed to achieve specific light effects. Not shown is an example in which not only one but two or more further painted layers 48 are applied on the painted layer 44.

Moreover, on the lateral areas 31, opaque components 30 are arranged on the further painted layer 48 and thus at least indirectly connected to the carrier layer 22. As in the first embodiment, the opaque components 30 at the lateral area 31 are forming fastening sections 32 to connect the trim part 123 with a housing 34 or with support elements of the vehicle 10 (not shown).

Beyond that, a protective layer 50 is applied to the outer surface 26 of the carrier layer 22. The protective layer 50 primarily serves for protecting the trim part 123 from external influences like UV-radiation and stone chipping. The protective layer 50 may be made of PUR (Polyurethane).

The foil 38 and the carrier layer 22 may be made of PC (Polycarbonate), while the opaque components 30 may be made of PC (Polycarbonate) and/or ABS (Acrylnitril-Butadien-Styrol-Copolymer).

LIST OF REFERENCE NUMBERS

10 Vehicle
121 to 123 trim part
14 grille
16 headlamp
18 pattern
20 logo
22 transparent carrier layer
24 inner surface
26 outer surface
28 light source
30 opaque component
31 lateral area
32 fastening section
34 housing
36 blank area
37 opening
38 foil
40 printed area
41 anti-fog layer
42 cut-out
44 painted layer
46 void area
48 further painted layer
50 protective layer The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. An illuminated or illuminable trim part of or for a vehicle, comprising:

a light source for providing light;

a transparent or translucent carrier layer, the carrier layer defining an inner surface opposite of an outer surface, at least one opaque component applied to the inner surface of the carrier layer, or at least one painted layer applied to the inner surface of the carrier layer, the opaque component or the painted layer defining openings, such that light from the light source passes through the openings and illuminates the outer surface of the carrier layer as an illuminated pattern, the carrier layer further defining a blank area at least partially surrounded by the illuminated pattern; and a foil overlying at least a portion of the inner surface of the carrier layer, the foil being transparent and comprising opaque or translucent printed areas within the blank area, such that the light provided by the light source can penetrate the foil around the opaque or translucent printed areas in a sub-portion of the blank area of the carrier layer.

2. The illuminated or illuminable trim part according to claim 1, wherein the blank area on the carrier layer is covered neither by the opaque component nor the painted layer.

3. The illuminated or illuminable trim part according to claim 1, wherein the printed areas comprise ink or paint.

4. The illuminated or illuminable trim part according to claim 1, further comprising a transparent or translucent layer applied to the outer surface of the carrier layer.

5. The illuminated or illuminable trim part according to claim 1, wherein a transparent or translucent anti-fog layer is applied on the foil.

6. The illuminated or illuminable trim part according to claim 1, wherein the painted layer comprises void areas through which the light can penetrate.

7. The illuminated or illuminable trim part according to claim 1, wherein a further painted layer is arranged on the painted layer.

8. A method for producing the illuminated or illuminable trim part of claim 1, comprising:

printing the printed areas on the foil;

inserting the foil into an injection mold; and molding the transparent or translucent carrier layer and thereby overmolding the foil.

9. The method according to claim 8, further comprising forming the foil by high pressure forming between the steps of printing and inserting.

10. The method according to claim 8, further comprising producing the carrier layer and the opaque component in two-component injection molding.

11. A vehicle, comprising a trim part manufactured by the method of claim 8.

12. A vehicle, comprising a trim part according to claim 1.

* * * * *